US007797498B2

(12) United States Patent
Jung et al.

(10) Patent No.: US 7,797,498 B2
(45) Date of Patent: Sep. 14, 2010

(54) APPARATUS AND METHOD FOR GARBAGE COLLECTION

(75) Inventors: Im Young Jung, Daejeon (KR); Sung Ik Jun, Daejeon (KR); Kyo II Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 113 days.

(21) Appl. No.: 10/578,390

(22) PCT Filed: Aug. 3, 2004

(86) PCT No.: PCT/KR2004/001949

§ 371 (c)(1),
(2), (4) Date: May 5, 2006

(87) PCT Pub. No.: WO2005/045683

PCT Pub. Date: May 19, 2005

(65) Prior Publication Data

US 2007/0136401 A1 Jun. 14, 2007

(30) Foreign Application Priority Data

Nov. 5, 2003 (KR) .............. 10 2003 0078126

(51) Int. Cl.
*G06F 12/00* (2006.01)
*G06F 13/00* (2006.01)
*G06F 13/28* (2006.01)
(52) U.S. Cl. .............. 711/154; 711/159; 707/816
(58) Field of Classification Search ............ 707/206, 707/816; 711/154, 159
See application file for complete search history.

(56) References Cited

U.S. PATENT DOCUMENTS

| 5,355,483 | A | * | 10/1994 | Serlet | 711/154 |
| 5,485,613 | A | * | 1/1996 | Engelstad et al. | 707/206 |
| 5,640,529 | A | * | 6/1997 | Hasbun | 711/103 |
| 5,740,395 | A | * | 4/1998 | Wells et al. | 711/103 |
| 2001/0023478 | A1 | | 9/2001 | Ozawa et al. | |
| 2002/0055941 | A1 | * | 5/2002 | Kolodner et al. | 707/200 |
| 2002/0118954 | A1 | * | 8/2002 | Barton et al. | 386/83 |

FOREIGN PATENT DOCUMENTS

| EP | 0175458 | 3/1986 |
| EP | 1104897 | 6/2001 |
| JP | 63 76033 | 4/1988 |
| JP | 4 149751 | 5/1992 |
| JP | 10 247160 | 9/1998 |
| JP | 2002 358492 | 12/2002 |

* cited by examiner

*Primary Examiner*—Stephen C Elmore
*Assistant Examiner*—Mark A Giardino, Jr.
(74) *Attorney, Agent, or Firm*—Ladas & Parry LLP

(57) ABSTRACT

A garbage collection apparatus and a method using the same are disclosed. The garbage collection method comprises: making a list of objects that must be deleted from a memory; calculating a predetermined residual time for responding to an external command; deleting the listed objects from the memory during the residual time; and storing a list of remaining objects that have not been deleted from the memory during the residual time. Accordingly, communication failure due to a response delay or timeout is prevented by distributed processing loads of garbage collection.

13 Claims, 16 Drawing Sheets

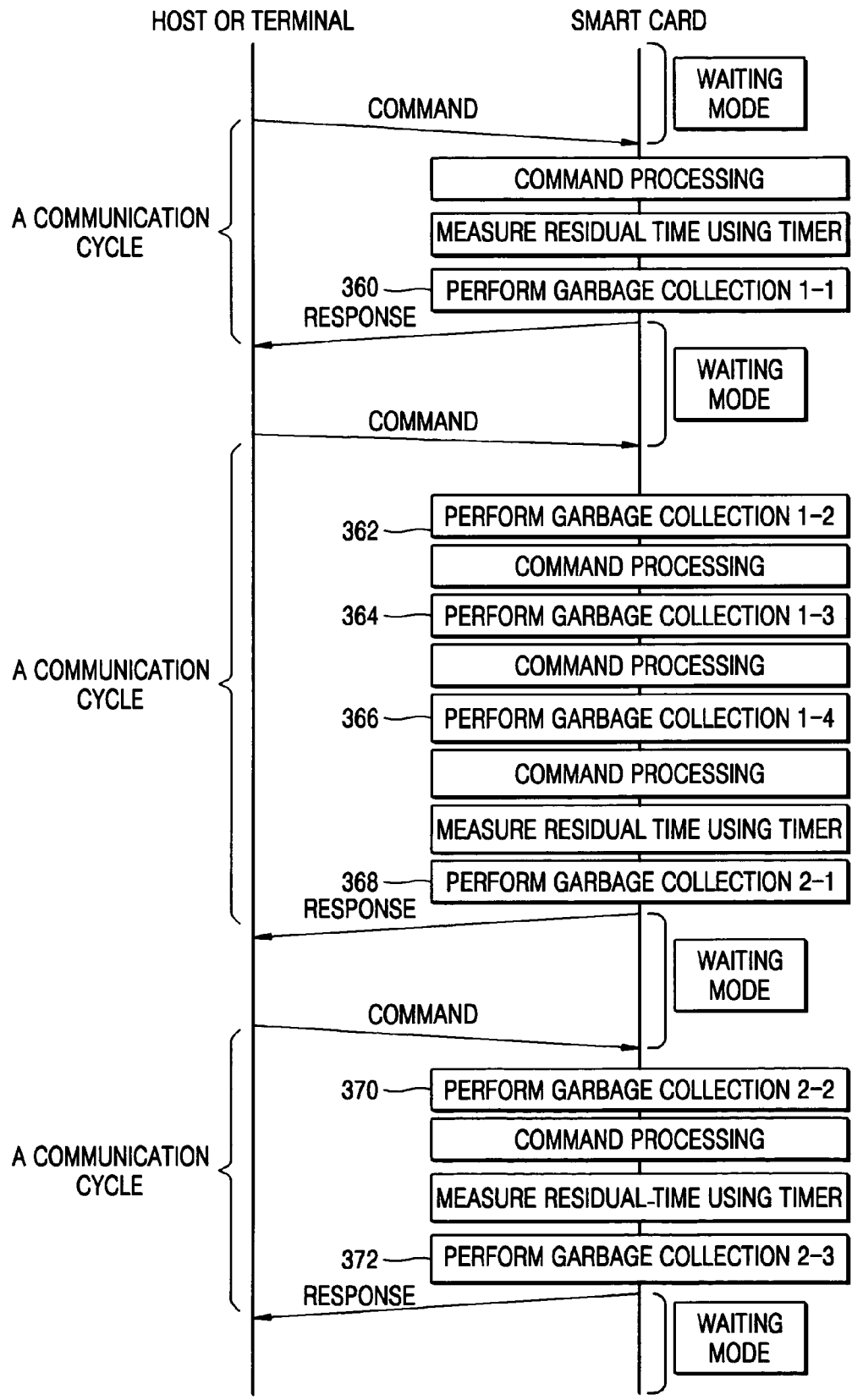

APPARATUS AND METHOD FOR GARBAGE COLLECTION

TECHNICAL FIELD

The present invention relates to a garbage collection apparatus and method, and more particularly, to an apparatus and method for performing garbage collection in a smart card.

BACKGROUND ART

In a mark-and-sweep method, one of the conventional garbage collection methods, garbage collection is achieved by performing together a mark phase and a sweep phase. On the other hand, in a partial garbage collection process, only some objects are examined and collected.

A smart card, a medium used for a user-interactive communication, can hardly be used for long data processing. Thus, in a command/response communication environment, a response time can be delayed due to a process such as the garbage collection, a processing time of which is not specially assigned. Therefore, when the garbage collection is performed, it must be considered that a user can feel a response delay and timeout can occur due to the response delay.

Also, for improving processing efficiency, most smart cards have a single thread operation structure using a one-chip processor, and only one application program is active when the user-interactive communication is performed. Therefore, the smart cards cannot have a separate process for managing the garbage collection, and also few application programs can be activated so that the partial garbage collection for a portion of an object can be efficiently performed. Furthermore, there are not sufficient resources with which the full/partial garbage collection can be always managed.

Accordingly, the garbage collection is requested when necessary, and a predetermined process is performed only during its activated period of time. In the garbage collection intermittently performed by being passively activated, processing time is influenced by both how much garbage must be collected and the length of the period of time required for examining whether an object is garbage. The former is determined according to a kind of memory in which an object management table and objects to be collected are mainly placed, and in a memory requiring a long processing time in a write operation, a processing time depends on the amount of processed data. The latter usually depends on the number of objects to be examined.

DISCLOSURE OF INVENTION

Technical Problem

In the smart card, it is difficult to perform both the mark and sweep phases in a garbage collection process. Particularly, it takes a lot of time to write in electrically erasable programmable read-only memory (EEPROM) used as persistent memory of the smart card. In the sweep phase of the garbage collection process, in order to collect memory space used for objects in the persistent memory or for transient objects of a case where an object management table is in EEPROM, a process of writing in EEPROM is necessary.

Accordingly, when the garbage collection is performed, a lot of processing time can be taken due to the writing in EEPROM. Therefore, a method of balancing a load by dividing a garbage collection process is required.

Technical Solution

The present invention provides an apparatus and method for performing garbage collection, which prevent communication failure due to a response delay or timeout related to a garbage collection in smart card by balancing a load of the garbage collection.

The present invention also provides a computer readable medium having recorded thereon a computer readable program for executing a method of performing garbage collection to prevent communication failure due to a response delay or timeout by balancing a load of the garbage collection.

Advantageous Effects

According to the present invention, stable memory can be secured in realtime by effectively managing the memory through distributed processing of garbage collection. Also, communication failure due to a response delay or timeout is prevented by distributed processing loads of garbage collection.

DESCRIPTION OF DRAWINGS

FIGS. 3A through 3G illustrate garbage collection methods according to an exemplary embodiment of the present invention.

BEST MODE

According to an aspect of the present invention, there is provided a garbage collection method comprising: making a list of objects that must be deleted from a memory; calculating a predetermined residual time for responding to an external command; deleting the listed objects from the memory during the residual time; and storing a list of remaining objects that have not been deleted from the memory during the residual time.

According to another aspect of the present invention, there is provided a garbage collection apparatus comprising: a timer, which calculates a predetermined residual time for responding to an external command; and a memory management unit, which makes a list of objects that must be deleted from a memory, deletes the listed objects from the memory during the residual time, and stores a list of remaining objects that have not been deleted from the memory during the residual time.

Accordingly, communication failure due to a response delay or timeout is prevented by balancing a load of the garbage collection.

Mode For Invention

Hereinafter, a garbage collection method and an apparatus using the same according to the present invention will now be described more fully with reference to the accompanying drawings, in which exemplary embodiments of the invention are shown.

Figure 1A:
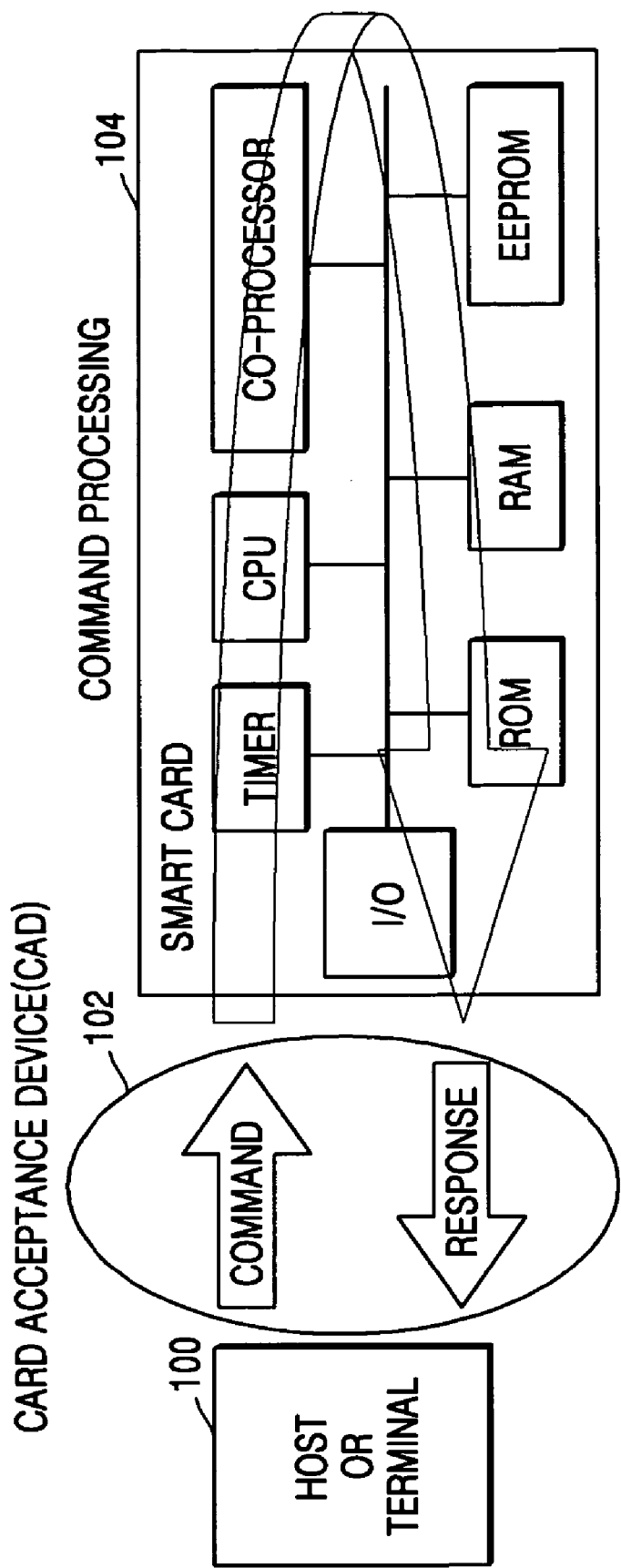
FIG. 1A illustrates a smart card and a communication method using the smart card.

FIG. 1A illustrates a smart card and a communication method using the smart card.

A smart card 104, which has a universal subscriber identity module (USIM) or a subscriber identity module (SIM) according to an international standard, communicates with a host (or a terminal) 100 via a card acceptance device CAD 102 using the ISO 7816 smart card communication standard.

In general, the smart card 104 is a system that includes a CPU, a memory such as RAM, ROM, and EEPROM, a bus, a timer, and an input/output interface. However, due to chip size limitation of the smart card 104, a capacity of a built-in memory and processing ability of a processor are limited. Accordingly, the smart card 104 is usually used as a passive medium, and a basic operating method of the smart card 104 is to process an input external command and transmit a processing result.

Figure 1B:
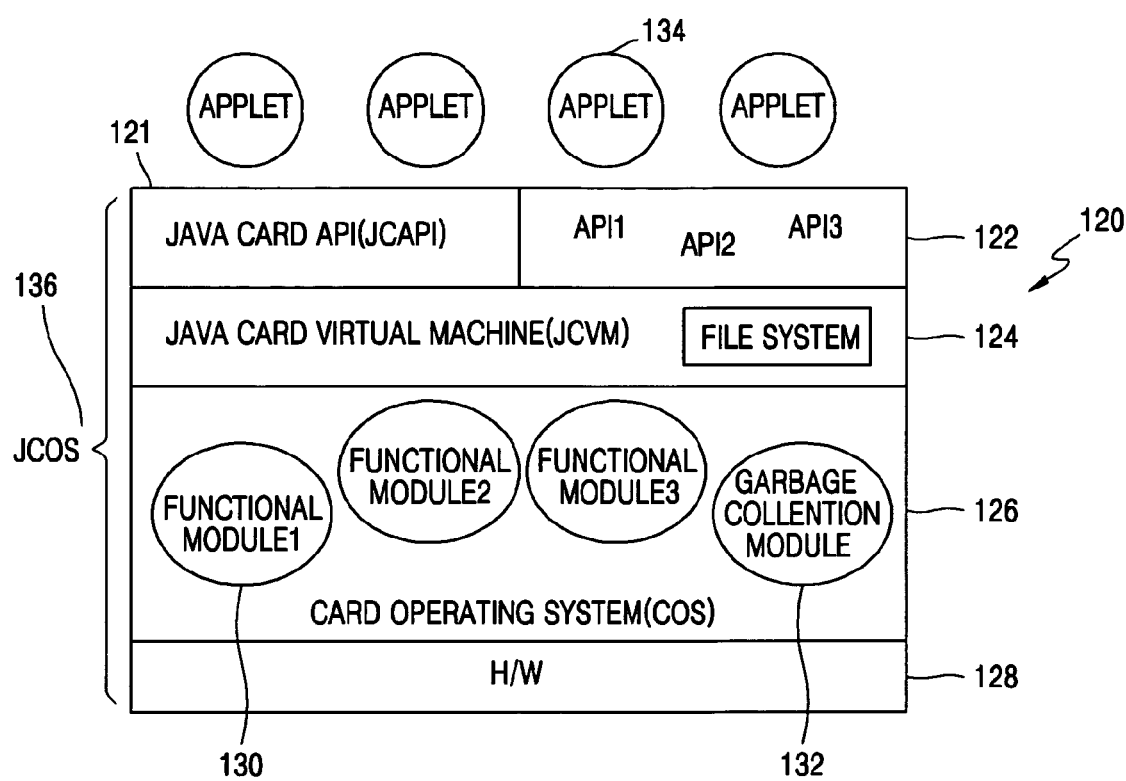
FIG. 1B illustrates a hierarchical structure of a Java smart card.

FIG. 1B illustrates a hierarchical structure of a Java smart card.

Referring to FIG. 1B, a card operating system (COS) 126 is placed in an upper layer than hardware (a silicon chip) 128 of a Java smart card 120, and a Java card virtual machine (JCVM) 124 is placed in an upper layer than the COS 126. In order to execute Java card applets 134, which are application programs of the smart card 120, the Java smart card 120 provides a Java card application programming interface (JCAPI) 121, and in order to allow the JCVM 124 or the JCAPI 121 to call function modules 130 provided by the COS 126, the Java smart card 120 provides a native-interface and other APIs 122 for additional functions.

Garbage collection using the Java smart card 120 is performed by a garbage collection module 132 of the COS 126. The Java smart card 120 provides the APIs 122 so that the garbage collection module 132 is passively called and used. The other portion besides the Java card applets 134 is called a JCOS 136.

In a smart card, it is important to guarantee a fast and even response time in response to a user's request and always secure working memory required for executing an application program on it. The former requires that a response delay is reduced in a ciphering process and a writing process in EEPROM, both particularly requiring a long processing time. In the garbage collection, a method of reducing a number of access times to write in EEPROM is considered. To satisfy the latter, since memory compaction is not performed due to its high cost, it is essential to reallocate a memory space, which is allocated and not used, by sweeping the memory space.

Figure 1C:
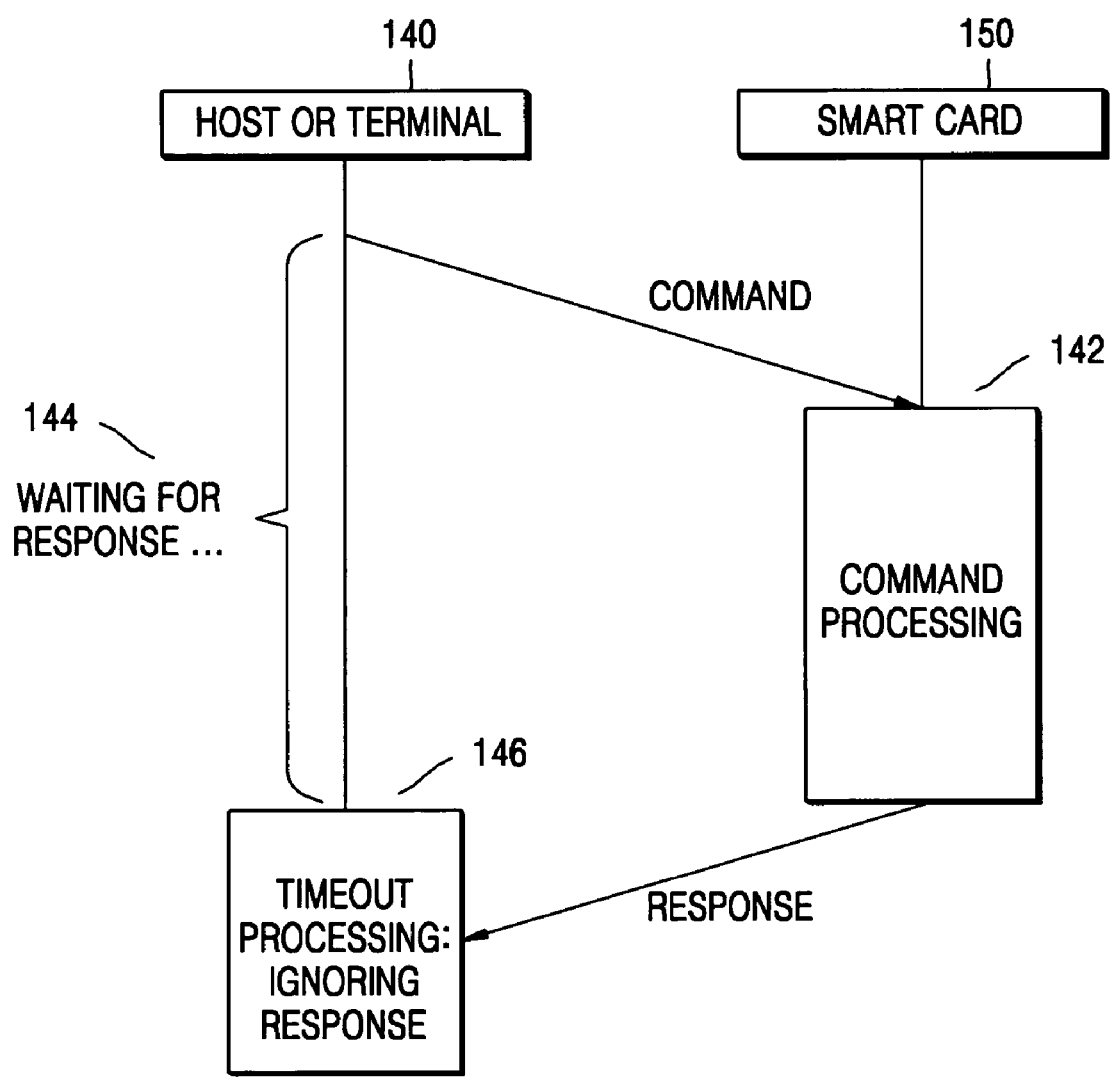
FIG. 1C illustrates a command processing process of the smart card.

FIG. 1C illustrates a command processing in the smart card.

Referring to FIG. 1C, a smart card 150, which is a user-interactive medium, has a time limit from receiving a command from a host (or a terminal) 140 to respond to the command.

Command processing 142 takes place between receiving the command from the host and responding to the command. If the host (or the terminal) 140 cannot receive the response within a predetermined time limit due to a long processing time in the smart card 150, the host (or the terminal) 140 performs a timeout process. When the timeout process is performed, the host (or the terminal) 140 expects the response within the predetermined time limit by re-transmitting the command to the smart card 150 a predetermined number of times in step 144. However, if the timeout process is performed every time, the host (or the terminal) 140 determines that the response is not received in step 146 as shown in FIG. 1C. A user can set the number of times the host (or the terminal) 140 transmit a command to the smart card 150 when a response does not return in a predetermined time limit.

Besides determining communication success/failure on the basis of whether a response against a command returns in a predetermined time limit, in a case of a user-interactive medium such as a smart card, an important element determining a communication quality of service (QoS) with the smart card 150 is how fast the smart card 150 can respond to a user's request.

Figure 1D:
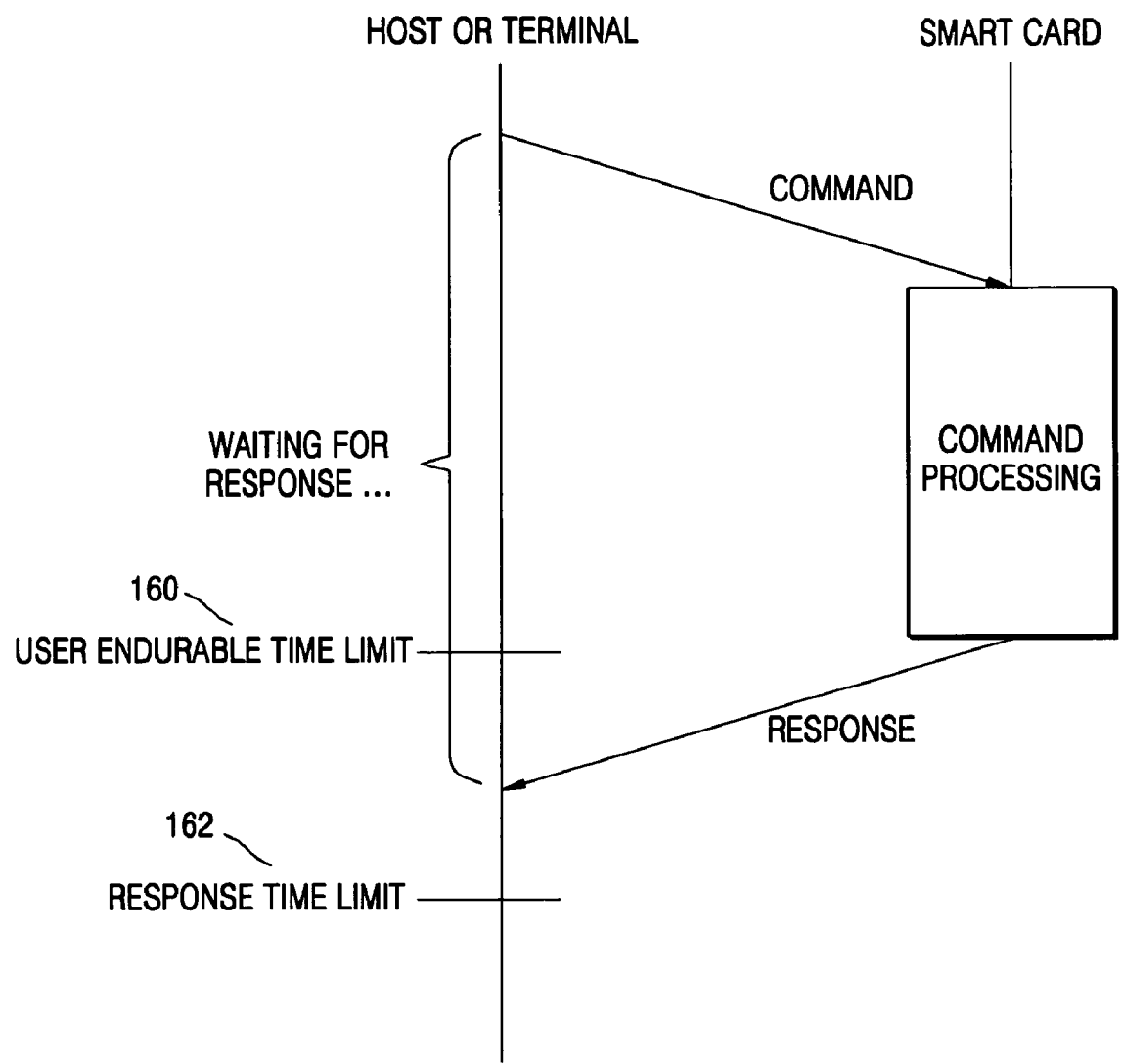
FIG. 1D illustrates a time limit for guaranteeing user's QoS.

FIG. 1D illustrates a time limit for guaranteeing user's QoS.

Referring to FIG. 1D, a response time limit 162 is different from a user waiting time limit 160 in pursuit of a better QoS, which is determined for improving a response delay affecting a user. When an application program related to a smart card is developed and when a smart card management module is designed, the response time limit 162 and how fast responses should be performed in the user waiting time limit 160 must be considered.

Figure 2A:
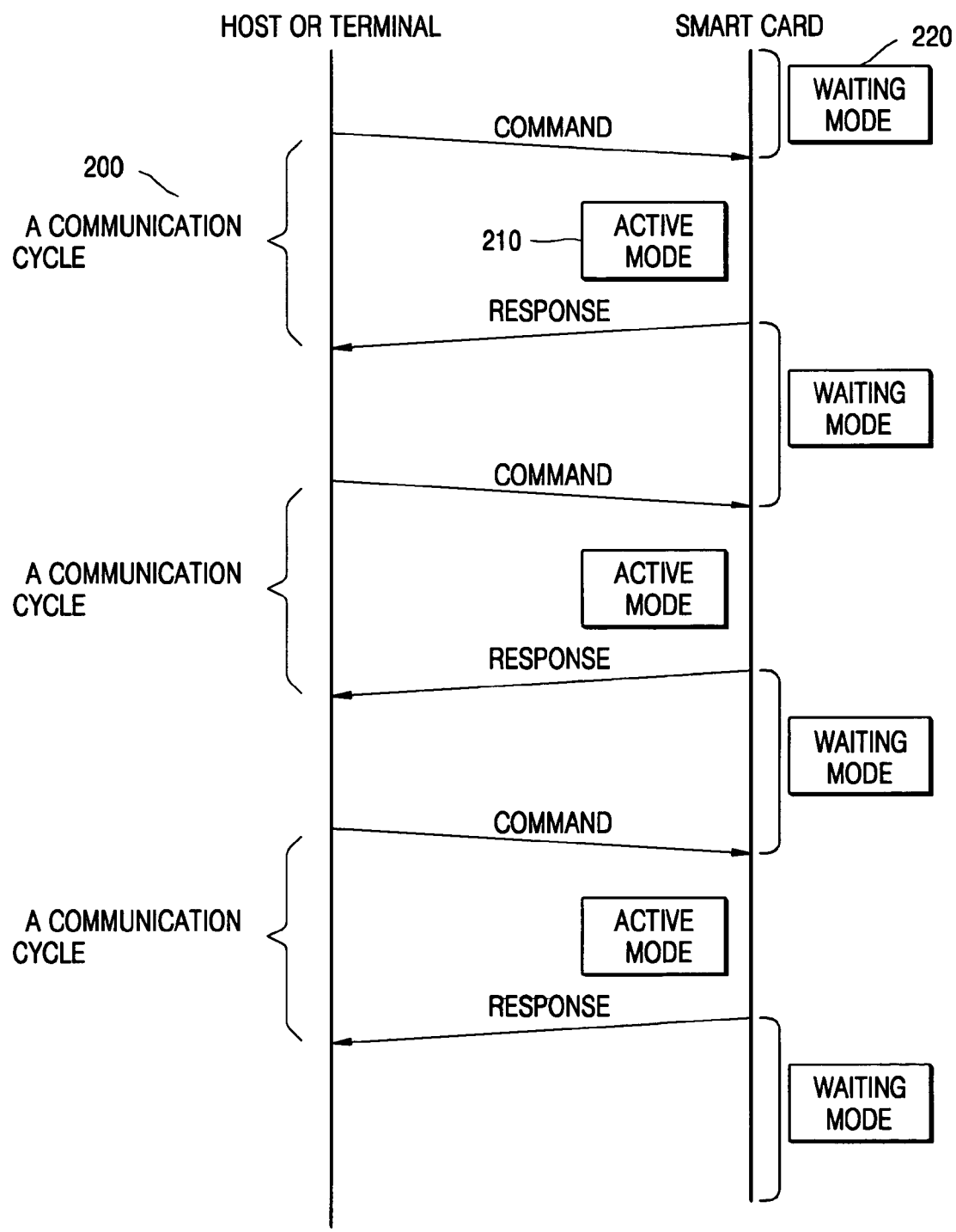
FIG. 2A illustrates a status change of a smart card communicating with a host (or a terminal)

FIG. 2A illustrates a status change of a smart card communicating with a host (or a terminal).

In detail, FIG. 2A shows relationship between communication cycles 200 and changes of status 210 and 220 of a smart card when a host (or a terminal) and the smart card communicate with each other via a CAD.

A communication cycle 200 is made up of a process wherein the host (or a terminal) transmits a command to the smart card and receives a response to the command from the smart card. A plurality of communication cycles 200 is made up of a card communication session between the host (or a terminal) and the smart card.

That is, the card communication session takes place from the time when the smart card is identified after being inserted into the CAD to the time when the smart card is pulled out from the CAD.

The smart card is in a waiting mode 220 between the time when a response is transmitted and the time when a new command is received. In the waiting mode 220, the smart card checks communication channels logically connected to an input/output unit of the smart card. The smart card is in an active mode 210 between the time when a command is received from the host (or a terminal) and the time when a response to the command is generated and transmitted. The smart card operates by alternating the two statuses 210 and 220

Figure 2B:
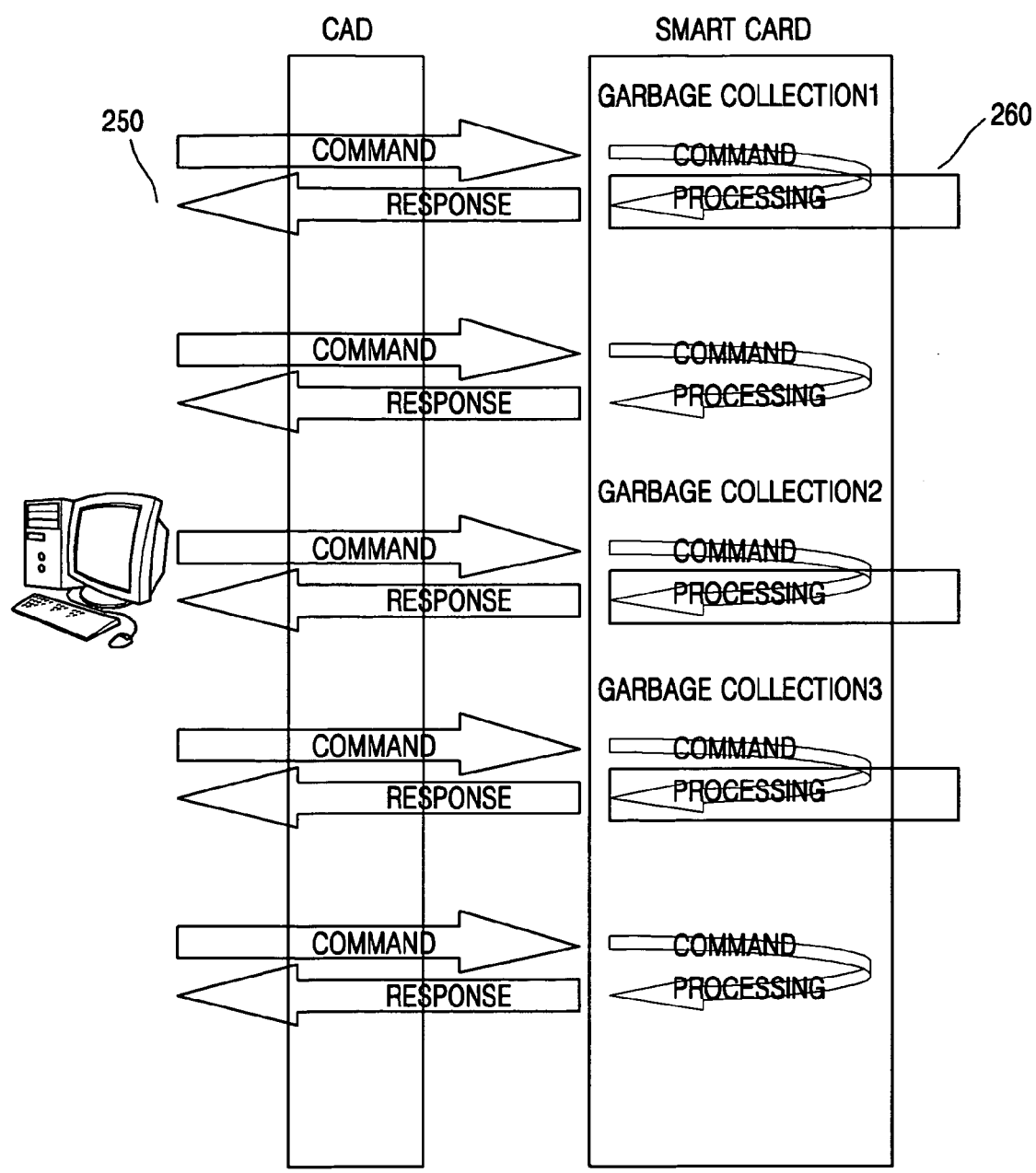
FIG. 2B illustrates a garbage collection method according to an exemplary embodiment of the present invention.

FIG. 2B illustrates a garbage collection method according to an exemplary embodiment of the present invention.

Referring to FIG. 2B, in a communication cycle 250, a smart card with a processor performs a command received from a host (or a terminal) and a smart card management process in an active mode 260. Accordingly, in a case of garbage collection, if a garbage collection request is internally generated and transferred to a COS, mark/sweep phases of the garbage collection are performed together in a current communication cycle or a next communication cycle.

Whenever the garbage collection is requested, the smart card uses a method of listing objects that must not currently be deleted from the smart card (mark phase) and deleting all objects except the listed objects from a memory (sweep phase). When the mark and sweep phases are performed with a normal command processing in a communication cycle, a response time may be delayed or temporary lack of memory due to the garbage collection may occur. It takes time to list objects to be deleted, furthermore, it also takes time to delete the objects due to characteristics of EEPROM in the smart card.

In the garbage collection method shown in FIG. 2B, any information required for the garbage collection does not have to be stored in the memory, and only memory required for currently performing garbage collection is necessary. Accordingly, in the method, RAM is utilized rather than memory requiring a writing delay such as EEPROM. Even if RAM is used, memory waste is prevented by using a stack space or an unused memory space of a reserved memory space and by not using a dedicated space.

However, since the garbage collection is not related to a normal operation of processing a received command and generating a response, a user may feel uncomfortable when using a smart card due to a response delay caused by the garbage collection.

Due to a burden by the garbage collection, a smart card that has a little processing ability and limited memory space, a module that automatically manages the garbage collection is not included, and the garbage collection is requested when it is necessary.

Memory of a smart card is small comparing to mega-media but is getting larger.

Also, since the number of objects generated by a smart card application program is getting larger, and accordingly, since the number of objects to be examined and garbage to be swept are getting larger, if processes of looking for garbage and deleting the garbage among objects in total memory are included in a garbage collection process, possibility of a response delay or timeout due to the garbage collection is getting larger.

FIGS. 3A through 3G illustrate garbage collection methods according to an exemplary embodiment of the present invention.

Figure 3A:
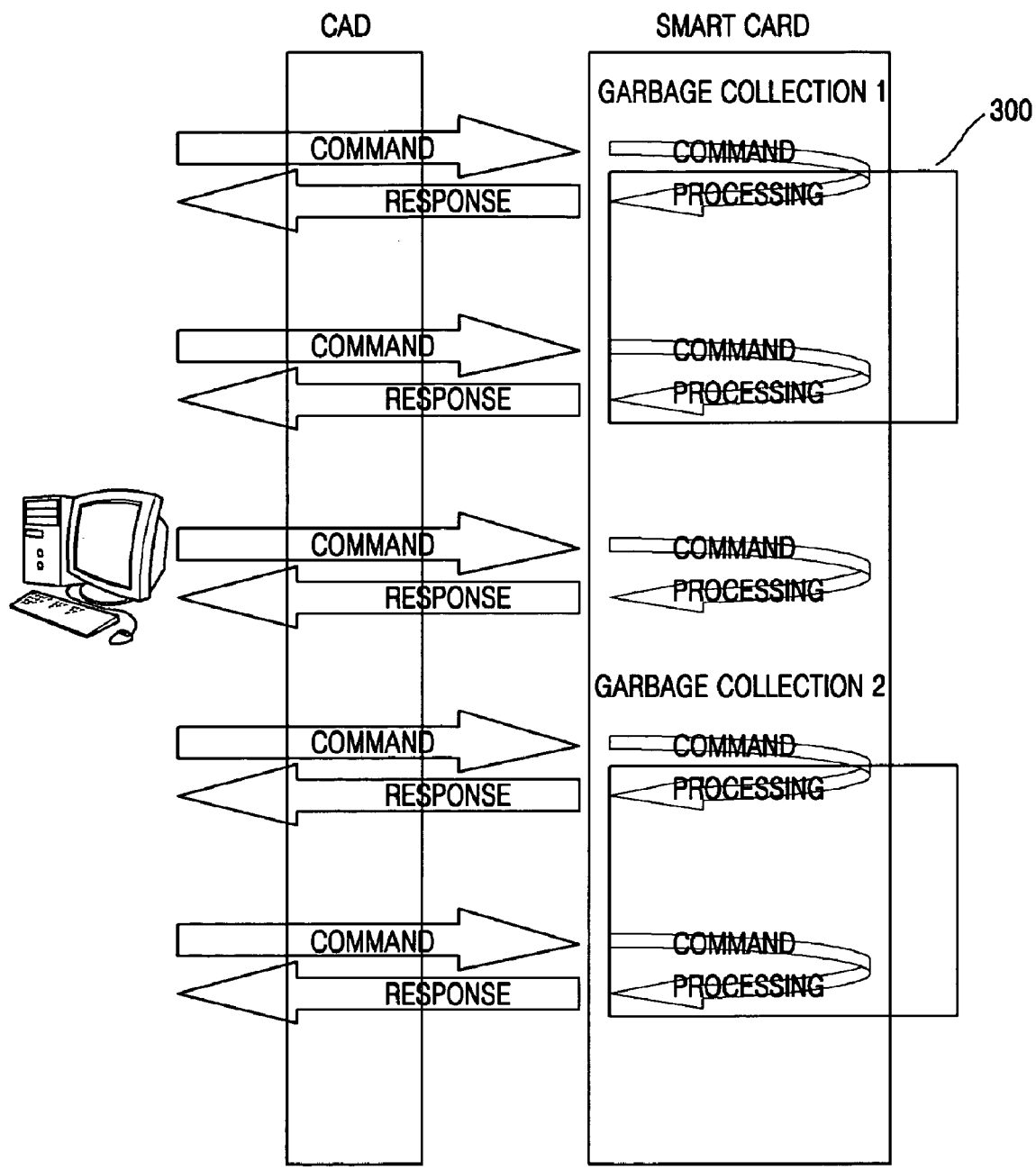

Referring to FIG. 3A, in order to reduce possibility of a response delay or timeout, a garbage collection process is distributed and performed in a plurality of communication cycles in step 300 A method of measuring an available time using a timer is used for distributed processing the garbage collection in the plurality of communication cycles.

In a mark phase of a garbage collection process, a list of objects that should not be deleted in a current status of a smart card is made, and a list of objects that should be deleted from an object table is also made on the basis of the list of objects not to be deleted. When an object is newly generated or deleted during execution of an application program, the two lists are updated together. When new garbage collection is requested, if there are objects remained in the list of objects to be deleted, new objects to be deleted are added to the list. A time to make a list of objects to be deleted is when two following cases occur. Also, if there is not an existing list of objects to be deleted, a new list is made:

1) when garbage collection is requested
2) when a communication session of a smart card is initialized.

When the new garbage collection is requested, if there is a residual time up to a response time limit even after objects in the existing list of objects to be deleted are clearly deleted, in a mark phase of the newly called garbage collection, a list of objects to be deleted is newly made.

In a sweep phase of the garbage collection, a residual time up to the response time limit of the smart card is measured on the basis of the list of objects to be deleted, and the objects to be deleted are deleted during the residual time. The objects, which remain in the list of objects to be deleted, not being deleted in a response time period, are stored in EEPROM or RAM. Whenever the smart card receives a command via a CAD, the smart card repeatedly processes the command and deletes objects to be deleted during a residual time up to the response time limit after the command processing is finished.

If a memory allocation request for a new object occurs during the command processing the smart card looks for free memory space of which elements to be returned by objects to be deleted and not to be allocated. And it allocate the free memory space to the new object. If a portion of the allocated memory is returned, it is dealt as another returned memory. The amount of required memory is reduced by managing object with a bitmap.

Figure 3B:
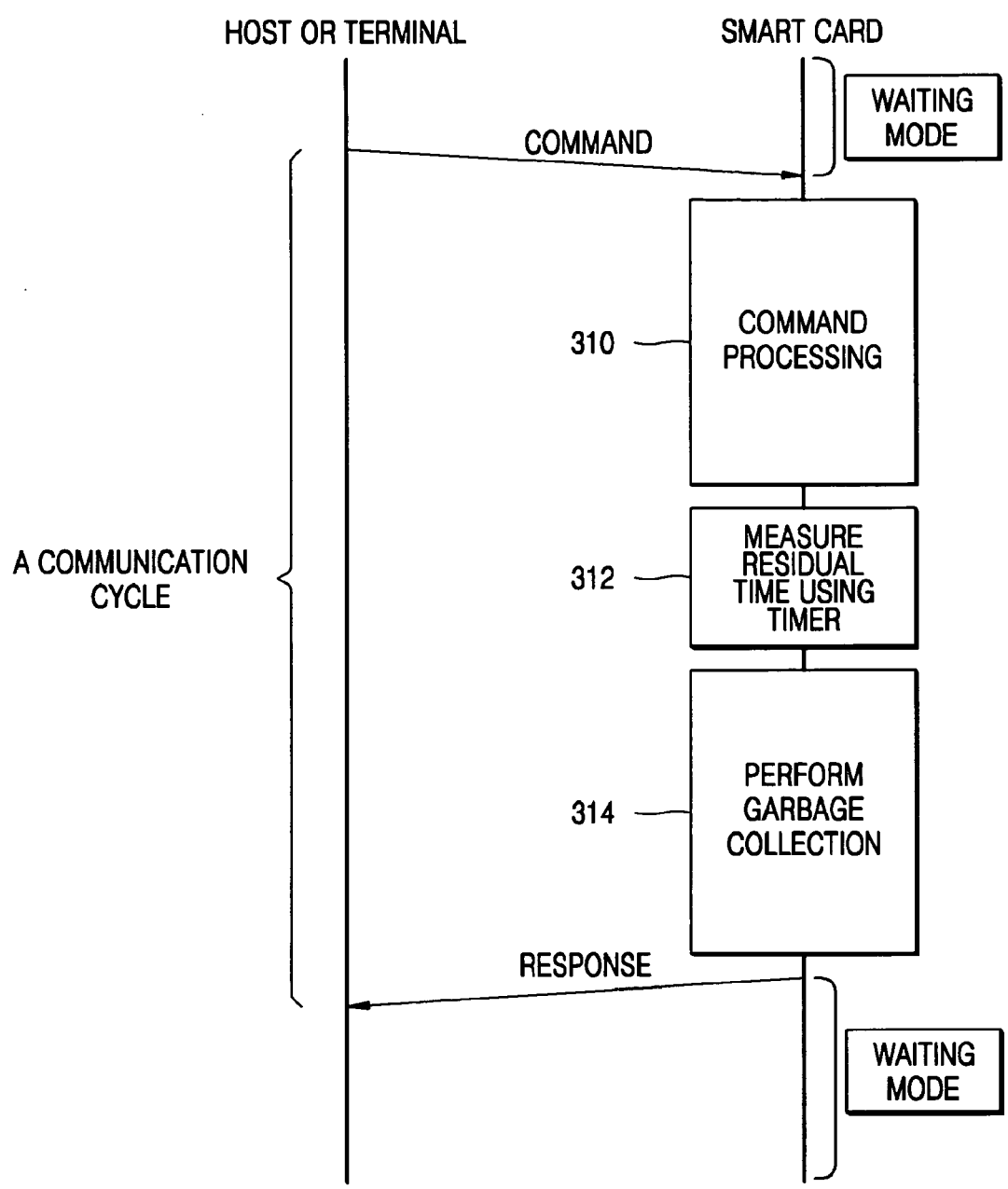

Referring to FIG. 3B, a smart card processes a command 310 and measures a residual time 312 up to a response time limit or a user waiting time limit for QoS. The smart card calculates the amount of garbage collection to be performed in a communication cycle, and if the garbage collection can be finished in the residual time, the smart card finishes the garbage collection 314.

FIGS. 3C through 3G illustrate cases of performing distributed processing when it is difficult to perform a garbage collection process in a predetermined time.

Figure 3C:
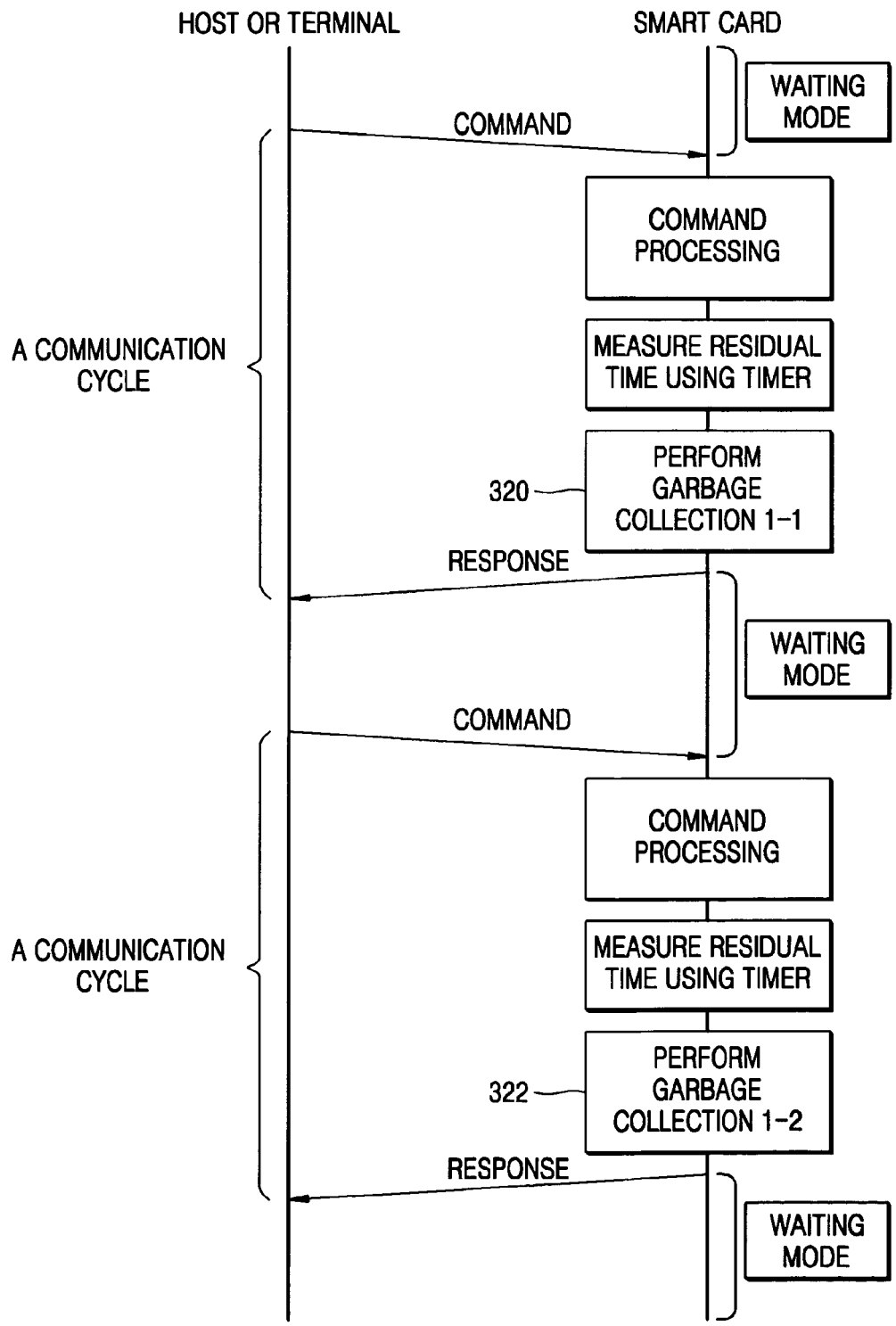

Referring to FIG. 3C, garbage collection is distributed and performed in two steps 320 and 322.

The amount of each garbage collection distributed into two steps is based on each available time measured after each command is processed in each communication cycle. If the mark-and-sweep method is used for the garbage collection, a method of separately performing a mark phase and a sweep phase or a separate collecting memory of objects in the sweep phase is selected.

When the garbage collection is performed over a plurality of communication cycles, an address list of objects to be deleted is stored in memory, and the sweep phase is performed using the address list. In order to exclude a possibility of losing a list of objects to be deleted examined in the mark phase when the garbage collection is performed over the plurality of communication cycles and examining the list again, the list of objects to be deleted is stored in EEPROM.

Figure 3D:
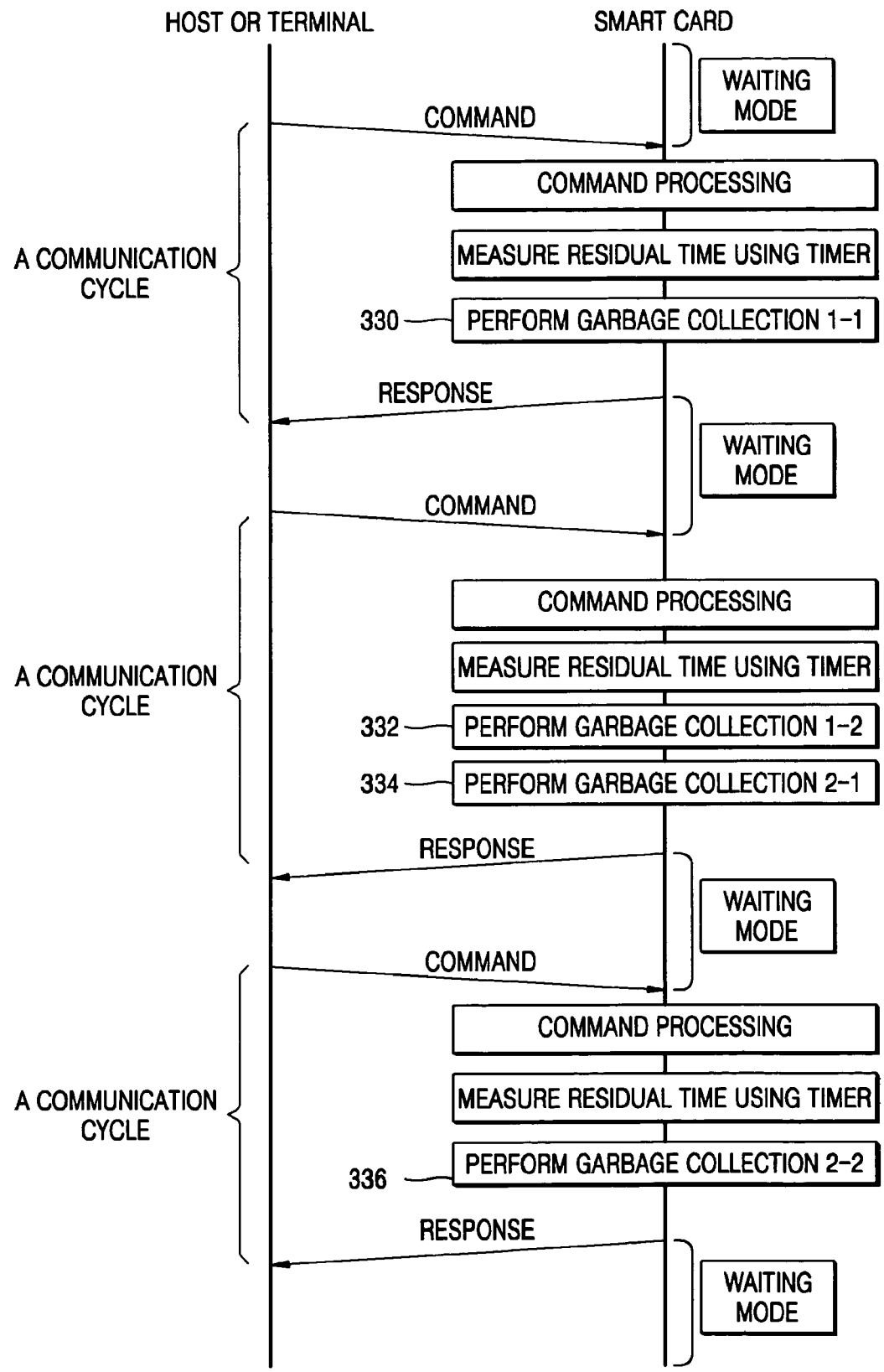
Figure 3E:
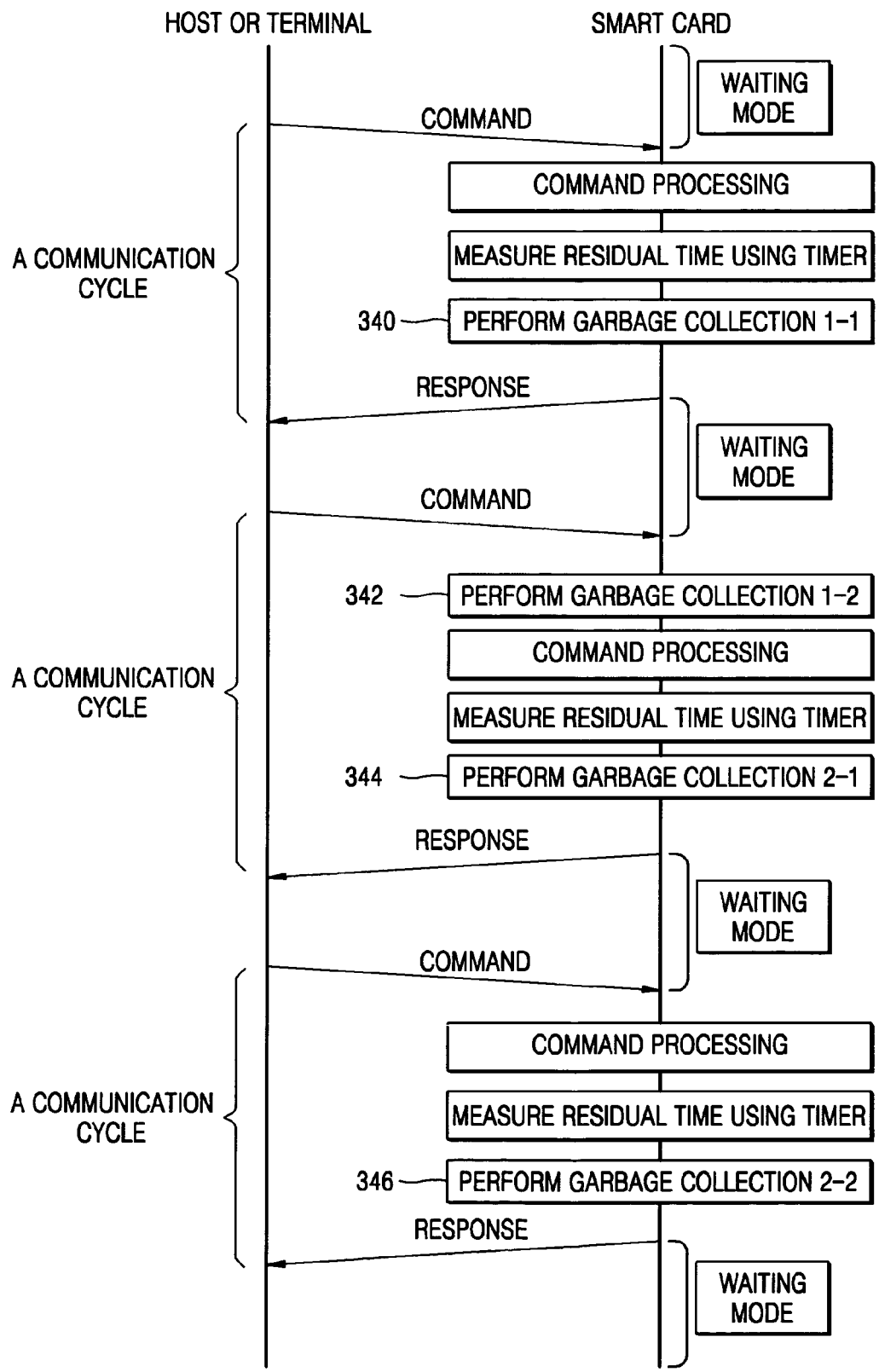

If the amount of garbage collection remained after a previous communication cycle is small, as shown in FIG. 3E, when a new communication cycle starts in response to a command, a command processing can be performed after the garbage collection is performed first of all.

If a new garbage collection process is requested before a current garbage collection process is finished, a method of finishing the current garbage collection process and starting the new garbage collection process or a method of adding objects to be deleted to a current list for objects to be deleted is used. However, in any case, schedule management is performed so that the newly requested garbage collection is clearly performed.

Referring to FIG. 3D garbage collection 330 is performed in a first communication cycle. In a second communication cycle, two parts 332 and 334 of the different garbage collection processes are performed. FIG. 3D shows a part 332 when a residual part of the garbage collection process performed in a first communication cycle is transferred and a part 334 when a new garbage collection process requested in the second communication cycle is partially performed during an available time remained.

A residual part 336 of the newly requested garbage collection process in the second communication cycle is transferred to a third communication cycle and finished.

Referring to FIG. 3E, the time for performing garbage collection is different from that of FIG. 3D. If the amount of residual garbage collection 342 after previous garbage collection 340 is small, after the residual garbage collection 342 is finished as soon as a command is received in a second communication cycle, the received command is processed. Garbage collection 344 newly requested in the second communication cycle is performed during a residual available time, and residual garbage collection 346 is transferred to a third communication cycle.

Figure 3F:
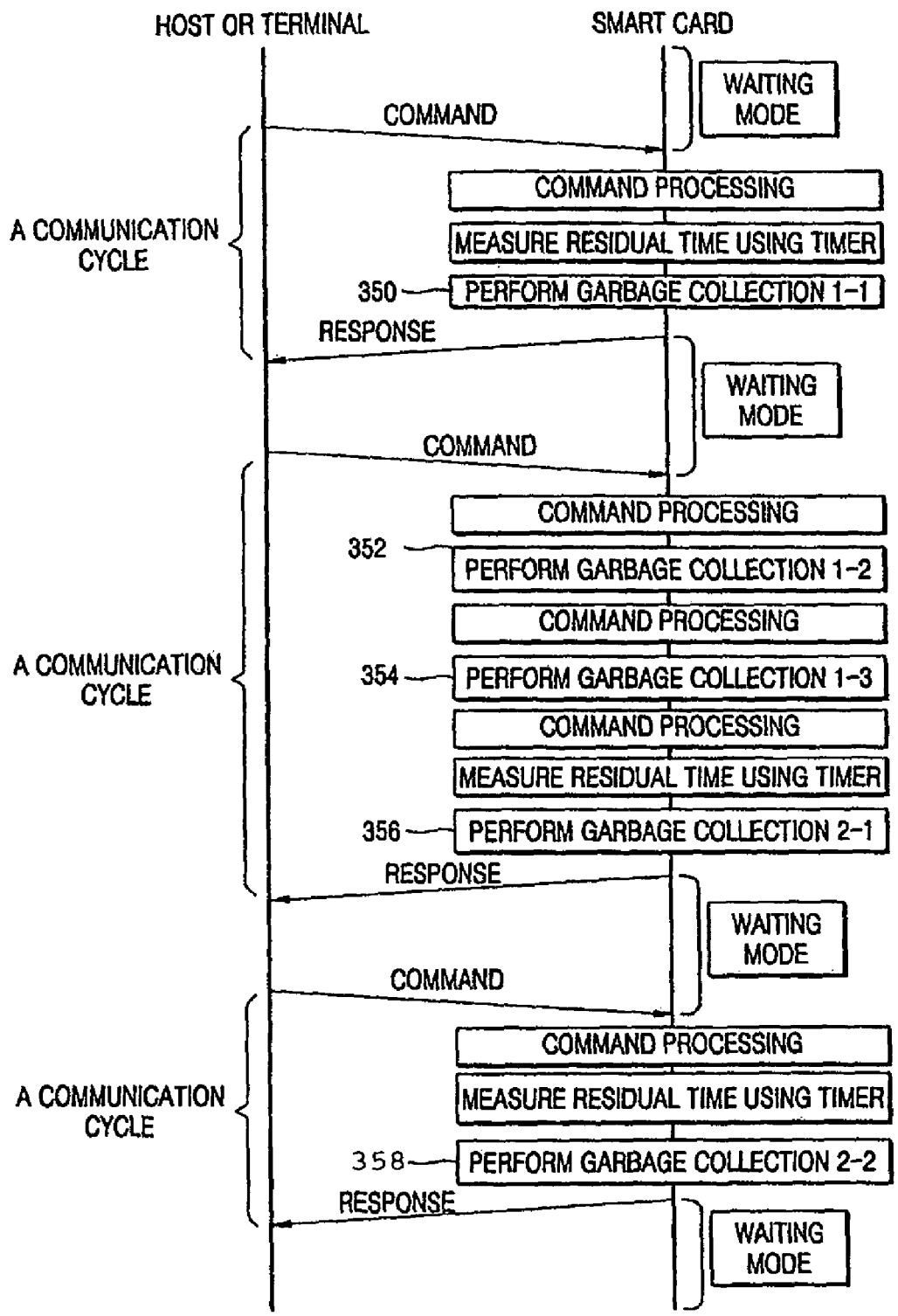

FIGS. 3F and 3G illustrate cases of performing garbage collection in the middle of command processing. FIG. 3F shows a first garbage collection being distributed and performed in parts 350, 352, and 354; and a second garbage collection being distributed and performed in parts 356 and 358. FIG. 3B shows a first garbage collection being distributed and performed in parts 360, 362, 364, and 366; and a second garbage collection being distributed and performed in parts 368, 370, and 372.

Since it takes a long time to write in EEPROM, a method to enhance the processing efficiency by concurrent performing garbage collection and command processing or concurrent performing an object deletion process and a sweep phase of the garbage collection during the command processing is used in steps 352 and 354.

In the former case, if EEPROM is used as persistent memory, writing by the unit of page is basically used in EEPROM. When writing on a same page is performed, a block time, which is generated when to write on different pages, can be removed. Accordingly, if a writing process is performed at a time of gathering data to be written on a page of EEPROM, a time for writing can be reduced. Also, a scheme of concurrent performing command processing and garbage collection processing can be used. FIGS. 3F and 3G show the times when distributed processing parts of garbage collection are performed.

Figure 4A:
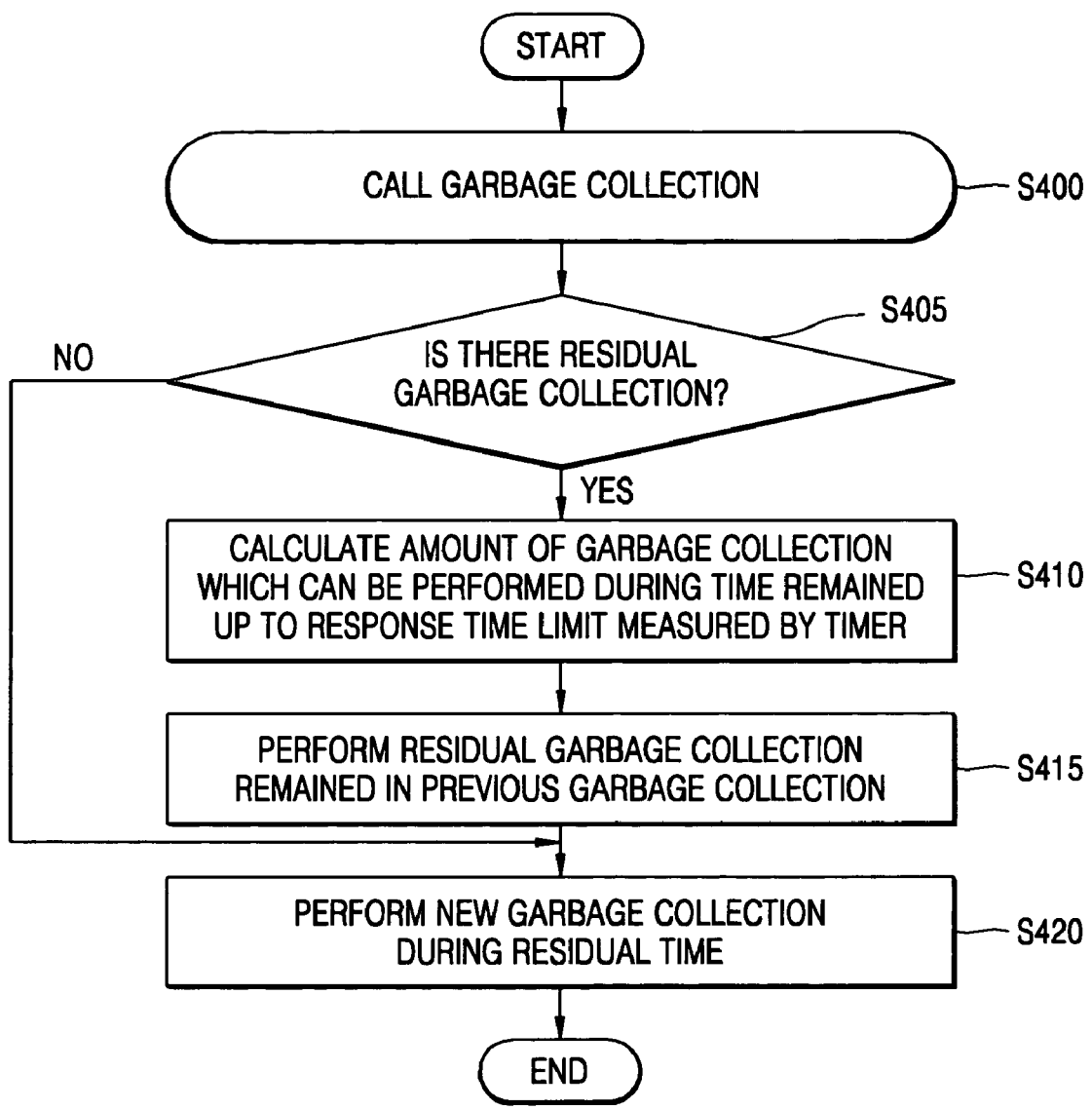
FIGS. 4A through 4C are flowcharts of garbage collection methods according to an exemplary embodiment of the present invention.
Figure 4B:
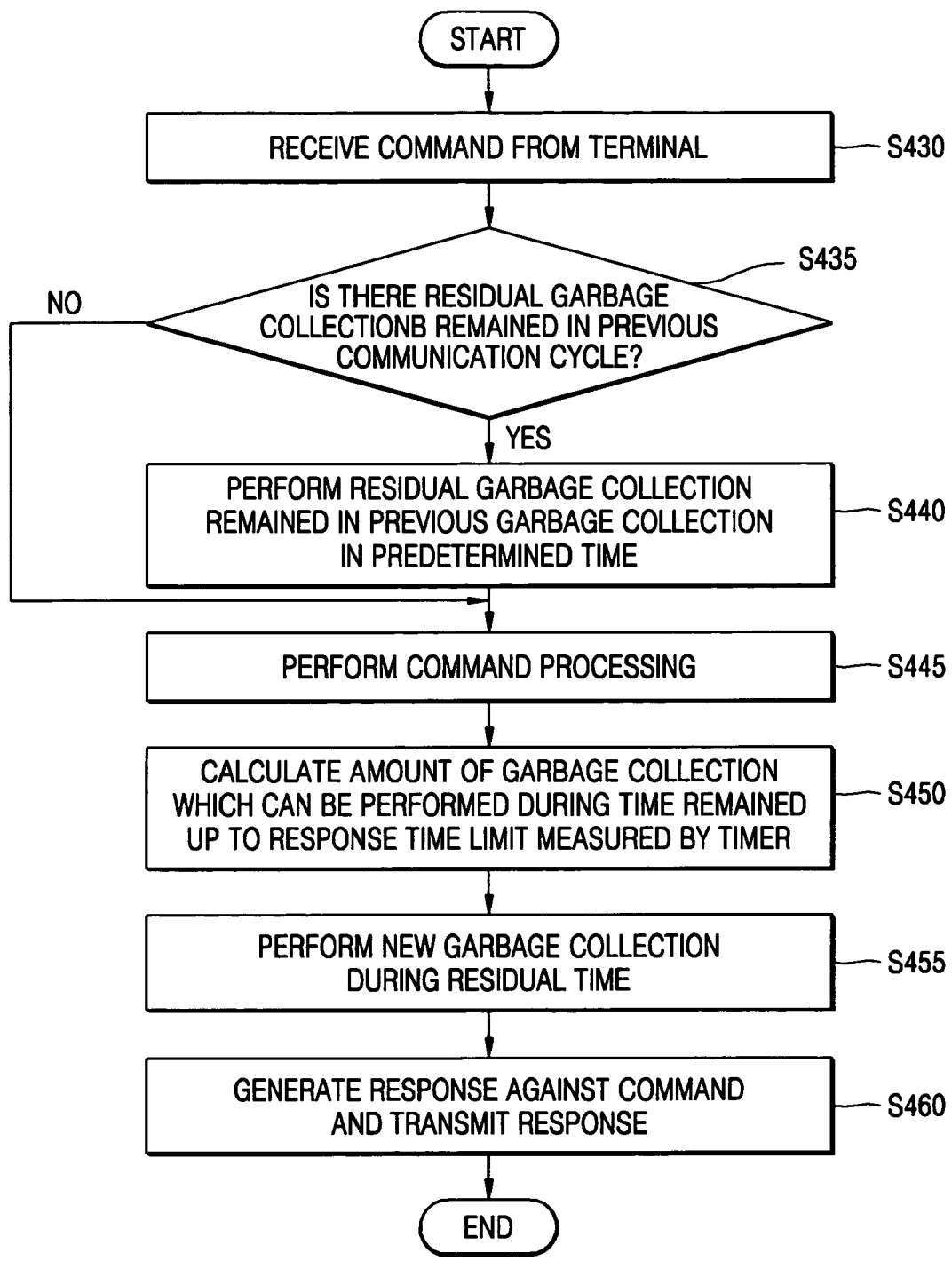
Figure 4C:
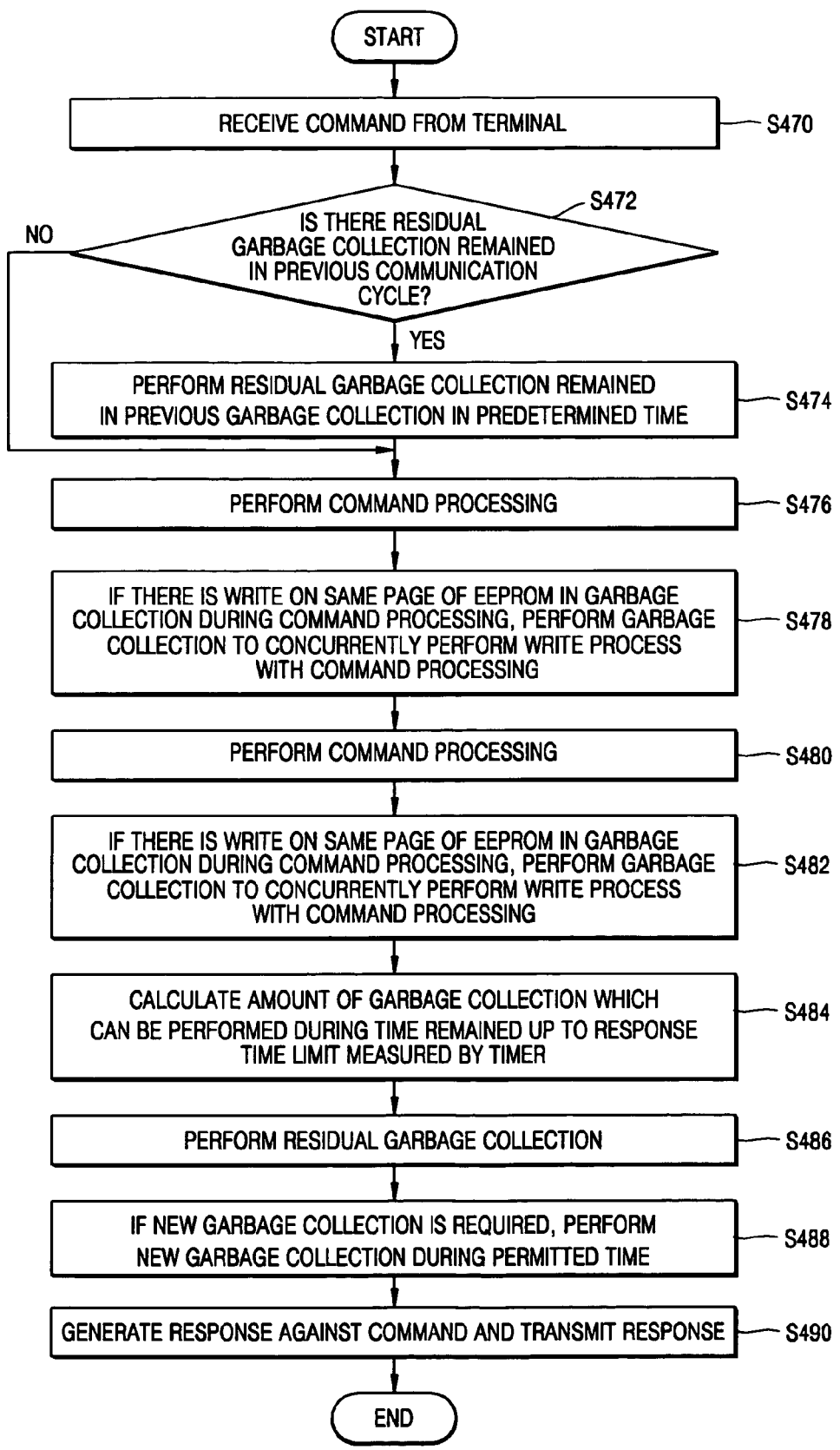

FIGS. 4A through 4C are flowcharts of garbage collection methods according to an exemplary embodiment of the present invention.

FIGS. 4A through 4C show flowcharts of garbage collection processing in a smart card during communication between a host (or a terminal) and the smart card shown in FIGS. 3A through 3G.

FIG. 4A shows a flowchart of garbage collection processing during a permitted residual time after command processing is finished in a smart card and the garbage collection is requested in step S400.

The smart card examines whether there is residual garbage collection in step S405.

If there are the residual garbage collection steps, the smart card measures the amount of the garbage collection that can be performed in a residual available time up to a response time limit in step S410. The residual garbage collection of a previous garbage collection process is performed in the measured available time in step S415. If the residual garbage collection of the previous garbage collection process cannot be finished, the new residual garbage collection is transferred to a next communication cycle. If there is a residual time after the residual garbage collection is finished, a newly requested garbage collection process is performed in step S420. The newly requested garbage collection is performed in an available time, and a residual amount of the garbage collection is transferred to a next communication cycle.

FIG. 4B shows a flowchart of a method of performing garbage collection remained in a previous communication cycle first of all and performing command processing of a smart card.

The smart card receives a command from a host (or a terminal) in step S430. Before the smart card performs the command, it examines whether there is residual garbage collection in the previous communication cycle in step S435. How much garbage collection the smart card performs before the command processing is based on the amount of residual garbage collection. The residual garbage collection in the previous communication cycle is processed in a predetermined time in step S440. The smart card performs the received command in step S445. After the command processing finishes, the smart card measures a residual available time and calculates the amount of garbage collection during the available time in step S450. If new garbage collection is requested, the new garbage collection is processed in the available time in step S455.

The smart card transmits a response for the command processing in step S460.

FIG. 4C shows a flowchart of a method of concurrently processing a command and a residual part of garbage collection of a previous communication cycle in the middle of the command processing.

A smart card receives a command from a host (or a terminal) in step S470. Before the smart card performs the command, it examines whether there is residual garbage collection in a previous communication cycle in step S472. If there is the residual garbage collection in the previous communication cycle, it is processed in a pre-determined time in step S474.

The smart card processes the received command in step S476. In the middle of the command processing on the smart card, if there is a write on a same page of EEPROM in the garbage collection, the smart card processes the garbage collection to concurrently perform the write process with the command processing in step S478. Then, the smart card processes the received command in step S480. Again, the smart card examines whether there is a write on a same page of EEPROM in the garbage collection during the command process and if there is a write on the same page of EEPROM in the garbage collection, the smart card processes the garbage collection together in step S482. After the command processing finishes, the smart card calculates the amount of garbage collection which can be performed during a residual time up to a response time limit measured by a timer in step S484. The smart card processes the amount of calculated garbage collection in step S486.

If a new garbage collection is requested, the smart card processes the new garbage collection up to a permitted time in step S488. When the smart card generates a response to the command and transmits the response to the host (or the terminal) in step S490, a communication cycle is finished. Steps S478 and S482 are concurrently performed with step S480. The smart card selects portions written in EEPROM of a garbage collection process and concurrently performs the portions with command processing and if a command includes portions having the advantages by performing concurrent processing rather than single processing when the portions are processed, the smart card processes garbage collection together.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

The invention claimed is:

1. A garbage data collection method performed during a communication cycle of a plurality of communication cycles of a computing device having memory including writeable non-volatile memory, the garbage data collection method comprising:
   performing a mark phase during a communication cycle, the mark phase for making a first list, the first list being an address list including addresses of objects to be deleted from the memory;
   performing a first sweep phase during the communication cycle to delete objects listed in the first list from the memory, wherein the performing of the sweep phase comprises:
      calculating a residual time up to a predetermined time limit after processing an external command;
      after calculating the residual time, deleting objects listed in the first list from the memory during the calculated residual time; and
      updating the first list to include addresses of remaining objects listed in the first list of objects to be deleted which cannot be deleted within the calculated residual time, and storing the updated first list in the memory separately from the objects so as to prevent deletion of the first list.

2. The method of claim 1, wherein the time limit is determined by a host that transmits the external command or the time limit is determined to be a period of time up to a time guaranteeing QoS that a user does not feel a response delay to the external command.

3. The method of claim 1, wherein the act of making the first list is performed when a garbage collection is requested or when a communication session for receiving the external command is initialized.

4. The method of claim 1, wherein the act of making the list of objects comprises:
   adding to the first list an address of an object that was to be deleted in a prior communication cycle but remains in the memory undeleted.

5. The method of claim 1, wherein the act of making the list of the objects comprises:
   updating the first list of when an object is newly generated or deleted during the command processing.

6. The method of claim 1, wherein the act of deleting the objects of the first list comprises:
   making a second list including addresses of objects to be deleted from the memory during any residual time remaining after deleting all objects listed in the first list.

7. The method of claim 1, further comprising:
   during the communication cycle, deleting objects listed on existing list which remain undeleted after a prior communication cycle before the external command is processed.

8. The method of claim 1, further comprising:
   if the command includes a memory write command or an object delete command, and if there is a list including addresses of objects to be deleted from the memory before the write or delete command is processed, performing the deleting of the objects together with the write or delete command.

9. The method of claim 1, wherein the deleting of listed objects comprises:
   if the objects listed in the first list exist in the memory in a consecutive order, deleting the consecutively ordered objects all together, and if a memory space to be allocated for an object and a memory space of the objects listed in the first list are consecutively ordered memory spaces or the same memory space, performing the acts of allocating and deleting together.

10. A garbage collection apparatus comprising:
    a timer, which calculates a residual time up to a predetermined time limit after processing an external command; and
    a memory management unit, which performs a mark phase during a communication cycle, the mark phase for making a list including addresses of objects to be deleted from a memory, and performs a first sweep phase during the communication cycle for deleting objects listed on the of list from the memory, wherein the sweep phase comprises deleting objects listed on the list from the memory during the calculated residual time, updating the list to include addresses of remaining objects listed in the list of objects which cannot be deleted within the lapse of the calculated residual time, and storing the updated list in memory separately from the objects so as to prevent deletion of the first list.

11. The apparatus of claim 10, wherein the memory management unit deletes objects listed on an existing list which includes addresses of objects which remain undeleted after a prior communication cycle before the external command is processed.

12. The apparatus of claim 10, wherein the memory management unit, if the command includes a memory write command or an object delete command, and if there is a list including addresses of objects to be deleted from the memory before the write or delete command is processed, performs the deletion of the objects together with the write or delete command.

13. A computer readable medium having recorded thereon a computer readable program for performing a garbage data collection method performed during a communication cycle of a plurality of communication cycles of a computing device having memory including writeable non-volatile memory, the garbage data collection method comprising:
    performing a mark phase during a communication cycle, the mark phase for making a first list, the first list being an address list including addresses of objects to be deleted from the memory;
    performing a first sweep phase during the communication cycle to delete objects listed in the first list from the memory, wherein the performing of the sweep phase comprises:
       calculating a residual time up to a predetermined time limit after processing an external command;
       after calculating the residual time, deleting objects listed In the first list from the memory within the calculated residual time; and
    updating the first list to include addresses of remaining objects listed in the first list which cannot be deleted within the calculated residual time, and storing the updated first list in the memory separately from the objects so as to prevent deletion of the first list.

* * * * *